(12) United States Patent
Chae (10) Patent No.: US 12,538,388 B2
(45) Date of Patent: Jan. 27, 2026

(54) CERAMIC HEATER AND MANUFACTURING METHOD THEREOF

(71) Applicant: MICO CERAMICS LTD., Anseong-si (KR)

(72) Inventor: Je Ho Chae, Pyeongtaek-si (KR)

(73) Assignee: MICO CERAMICS LTD., Anseong-si (KR)

( * ) Notice: Subject to any disclaimer, the term of this patent is extended or adjusted under 35 U.S.C. 154(b) by 967 days.

(21) Appl. No.: 17/767,032

(22) PCT Filed: Jan. 7, 2020

(86) PCT No.: PCT/KR2020/000275
§ 371 (c)(1),
(2) Date: Apr. 6, 2022

(87) PCT Pub. No.: WO2021/080088
PCT Pub. Date: Apr. 29, 2021

(65) Prior Publication Data
US 2022/0377848 A1  Nov. 24, 2022

(30) Foreign Application Priority Data
Oct. 22, 2019  (KR) .......................... 10-2019-0131087

(51) Int. Cl.
*H05B 3/03* (2006.01)
*H05B 3/14* (2006.01)

(52) U.S. Cl.
CPC .............. *H05B 3/03* (2013.01); *H05B 3/143* (2013.01); *H05B 2203/017* (2013.01)

(58) Field of Classification Search
None
See application file for complete search history.

(56) References Cited

U.S. PATENT DOCUMENTS 5,817,406 A * 10/1998 Cheung ................ C23C 16/4586
219/385
6,225,606 B1 * 5/2001 Tsuruta .................. H05B 3/283
219/544
(Continued)

FOREIGN PATENT DOCUMENTS

JP  2007-35886 A   2/2007
JP  2010-56040 A   3/2010
(Continued)

OTHER PUBLICATIONS

JP 2017101277 A (Ogami) Jun. 8, 2017 [retrieved on Apr. 21, 2025]. Retrieved from Foreign Image and Text database, translation by Clarivate Analytics (Year: 2017).*
(Continued)

*Primary Examiner* — Edward F Landrum
*Assistant Examiner* — Theodore J Evangelista
(74) *Attorney, Agent, or Firm* — BROADVIEW IP LAW, PC (57) ABSTRACT

The present invention relates to a ceramic heater with improved reliability, the ceramic heater including: a heater body having a mesh type high-frequency electrode, and an electrode rod connecting member being in contact with a lower surface of the high-frequency electrode; and a heater support mounted on a lower portion of the heater body and configured to support the heater body, in which the electrode rod connecting member is in area contact with one surface of the high-frequency electrode.

9 Claims, 8 Drawing Sheets

(56) References Cited

U.S. PATENT DOCUMENTS

2014/0231019 A1    8/2014  Kajihara
2021/0242062 A1    8/2021  Jung et al.

FOREIGN PATENT DOCUMENTS

| JP | 2017101277 A | * | 6/2017 |
|---|---|---|---|
| KR | 1020170001497 A | | 1/2017 |
| KR | 10-2018-0099339 A | | 9/2018 |
| KR | 101904490 B1 | | 10/2018 |
| KR | 1020190103795 A | | 9/2019 |
| WO | 2013/169019 A1 | | 11/2013 |

OTHER PUBLICATIONS

Office Action for CN 202080060581.1 by China National Intellectual Property Administration dated Jul. 19, 2024.
Notice of Allowance for JP 2022-513843 by Japan Patent Office dated Jun. 4, 2024.
Office Action for KR 10-2019-0131087 by Korean Intellectual Property Office dated Jun. 11, 2024.
Office Action for TW 109101183 by Taiwan Intellectual Property Office dated May 2, 2024.
International Search Report for PCT/KR2020/00275 dated Jul. 17, 2020.
Office Action for TW 109101183 by Taiwan Intellectual Property Office dated Aug. 31, 2023.
Office Action for JP 2022-513843 by Japan Patent Office dated Dec. 5, 2023.

\* cited by examiner

CERAMIC HEATER AND MANUFACTURING METHOD THEREOF

CROSS-REFERENCE TO RELATED APPLICATIONS

This application is a National Phase Entry Application of PCT Application No. PCT/KR2020/000275 filed on Jan. 7, 2020, which claims priority to Korean Patent Application No. 10-2019-0131087 filed on Oct. 22, 2019 in Korean Intellectual Property Office, the entire contents of which is hereby incorporated by reference in its entirety.

FIELD OF THE INVENTION

The present invention relates to a ceramic heater and a method of manufacturing the same, and more particularly, to a ceramic heater with improved reliability and a method of manufacturing the same.

BACKGROUND OF THE INVENTION

In general, a semiconductor device or a display device is manufactured sequentially laminating and patterning multiple thin film layers, including dielectric layers and metal layers, on a glass substrate, a flexible substrate, or a semiconductor wafer substrate. These thin film layers are sequentially deposited on the substrate by a chemical vapor deposition (CVD) process or a physical vapor deposition (PVD) process. Examples of the CVD processes include a low-pressure chemical vapor deposition (LPCVD) process, a plasma enhanced chemical vapor deposition (PECVD) process, a metal organic chemical vapor deposition (MOCVD) process, and the like.

In the device for the CVD and PVD processes, a heater is disposed to support the glass substrate, the flexible substrate, or the semiconductor wafer substrate and apply predetermined heat to the glass substrate, the flexible substrate, or the semiconductor wafer substrate. The heater is also used to heat the substrate during a process of etching the thin film layers formed on the supported substrate and a process of firing a photoresist. As the heater installed in the device for the CVD and PVD processes, a ceramic heater is widely used to meet the requirements of accurate temperature control, fine wiring of semiconductor elements, and precise heat treatment on the semiconductor wafer substrate.

Figure 1A:
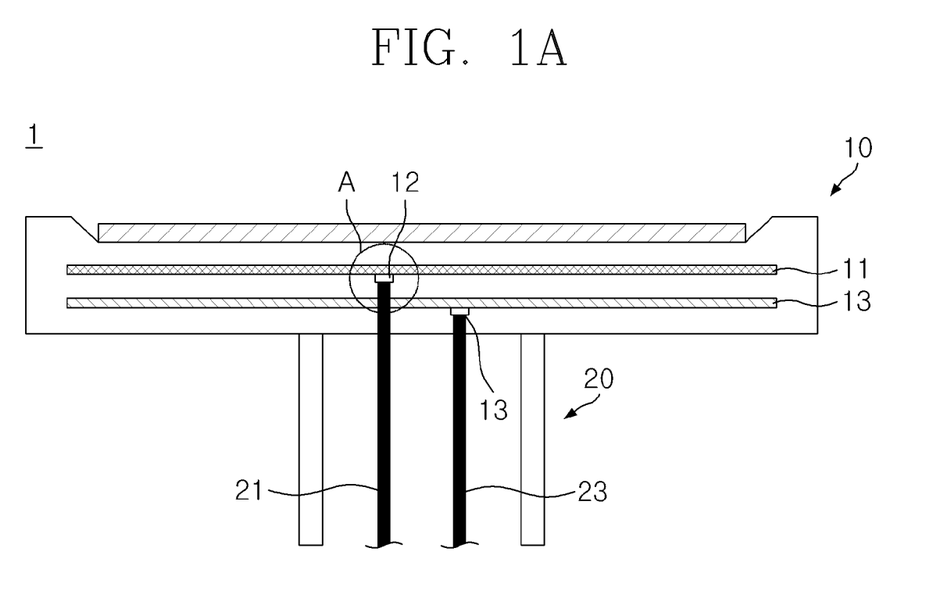
FIG. 1A is a view illustrating a configuration of a ceramic heater in the related art.

FIG. 1A is a view illustrating a configuration of a ceramic heater in the related art. As illustrated in FIG. 1A, during a semiconductor manufacturing process, a ceramic heater 1 is used to support a substrate such as a wafer and heat the substrate to a process temperature, for example, a temperature at which the CVD or PVD process is to be performed.

The ceramic heater 1 in the related art includes a ceramic main body 10 having a circular plate-shaped structure, and a ceramic support unit 20 mounted below the ceramic main body 10. Here, the ceramic main body 10 includes a high-frequency electrode (or ground electrode) 11 configured to discharge, to the ground, electric currents with which the ceramic heater 1 is charged when creating plasma, a heating element 13 configured to create thermal energy for heating a substrate, a first rod connecting member 12 configured to electrically connect the high-frequency electrode 11 and a ground rod 21, and a second rod connecting member 14 configured to electrically connect the heating element 13 and a heating element rod 23. The ceramic support unit 20 includes the ground rod 21 configured to connect the high-frequency electrode 11 to the ground, and the heating element rod 23 configured to connect the heating element 13 to an external power source (not illustrated).

The high-frequency electrode 11 embedded in the ceramic heater 1 is made of a metal material that has a high melting point and may serve as the plasma ground. In general, the high-frequency electrode 11 is manufactured in the form of a mesh having a woven fabric shape in which metal wires made of molybdenum (Mo) and arranged in a vertical direction and metal wires made of molybdenum (Mo) and arranged in a horizontal direction intersect one another. The first rod connecting member 12 is in contact with one region of the mesh type high-frequency electrode 11.

Figure 1B:
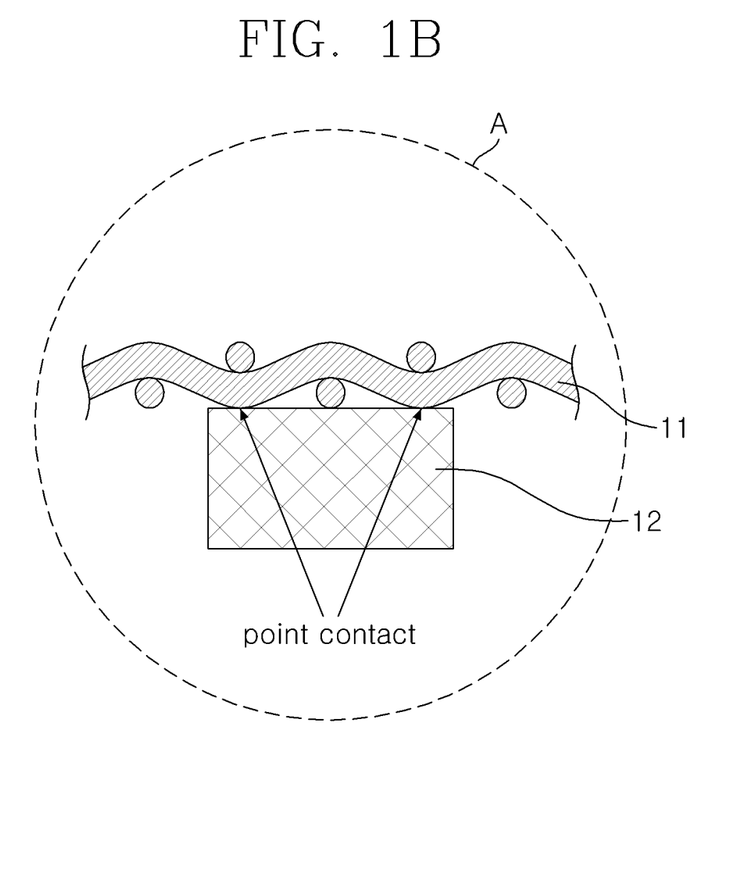
FIG. 1B is an enlarged view of part A illustrated in FIG. 1A.

However, as illustrated in FIG. 1B, the high-frequency electrode 11 of the ceramic heater 1 in the related art is in point contact with a contact surface of the first rod connecting member 12. That is, the metal (circular) wires made of molybdenum, which constitute the high-frequency electrode 11, are in point contact with the contact surface of the first rod connecting member 12. Contact resistance is greatly increased due to the point contact, and predetermined heat is generated at the contact point, which causes a defect, for example, a crack to be formed between the high-frequency electrode 11 and the first rod connecting member 12.

Recently, because the frequency to be used is gradually increased to increase the throughput during the semiconductor process, it is essential to quickly move electric charges accumulated in the dielectric material. Accordingly, there is a need for minimizing the contact resistance between the high-frequency electrode 11 and the first rod connecting member 12.

BRIEF SUMMARY OF THE INVENTION

An object of the present invention is to solve the above-mentioned problems and other problems. Another object of the present invention is to provide a ceramic heater with improved reliability and a method of manufacturing the same.

Still another object of the present invention is to provide a ceramic heater in which an electrode rod connecting member is in area contact with one surface of a high-frequency electrode, and to provide a method of manufacturing the ceramic heater.

In order to achieve the objects, one aspect of the present invention provides a ceramic heater including: a heater body having a mesh type high-frequency electrode, and an electrode rod connecting member being in contact with a lower surface of the high-frequency electrode; and a heater support mounted on a lower portion of the heater body and configured to support the heater body, in which the electrode rod connecting member is in area contact with one surface of the high-frequency electrode.

More particularly, the high-frequency electrode may include a plurality of wire type metals arranged in a first direction and a plurality of wire type metals arranged in a second direction perpendicular to the first direction. In addition, the high-frequency electrode may have a horizontal cross-sectional portion to be in area contact with the electrode rod connecting member. In addition, a contact area between the high-frequency electrode and the electrode rod connecting member may be equal to or larger than a predetermined critical value.

More particularly, the horizontal cross-sectional portion may be formed by processing one surface of the high-frequency electrode. Here, a thickness of a portion removed by processing one surface of the high-frequency electrode may be $1/5$ to $1/2$ of an overall thickness of the high-frequency electrode. In addition, a method of processing one surface of the high-frequency electrode includes a polishing method and a rolling method.

More particularly, the horizontal cross-sectional portion is formed at a position of the high-frequency electrode corresponding to a position of the electrode rod connecting member. In addition, the electrode rod connecting member is attached to the horizontal cross-sectional portion of the high-frequency electrode through a brazing process. In addition, the horizontal cross-sectional portion may be equal to or larger than an area of a contact surface of the electrode rod connecting member.

DETAILED DESCRIPTION OF THE INVENTION

Hereinafter, exemplary embodiments disclosed in the present specification will be described in detail with reference to the accompanying drawings. The same or similar constituent elements are assigned with the same reference numerals regardless of reference numerals, and the repetitive description thereof will be omitted. In the following description of the exemplary embodiments according to the present invention, when a layer (or film), a region, a pattern, or a structure is referred to as being formed "on" or "under" another substrate, another layer (or film), another region, another pad, or another pattern, it can be "directly" or "indirectly" on the other substrate, the layer (or film), the region, the pad, or the pattern, or one or more intervening layers may also be present. The position on/above or under/below the layer will be described based on the drawings. A thickness or a size of each layer in the drawings is exaggerated, omitted, or schematically illustrated for the purpose of clarity and for convenience of description. In addition, a size of each constituent element does not entirely reflect an actual size.

In the description of the exemplary embodiment disclosed in the present specification, the specific descriptions of publicly known related technologies will be omitted when it is determined that the specific descriptions may obscure the subject matter of the exemplary embodiment disclosed in the present specification. In addition, it should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The present invention provides a ceramic heater with improved reliability and a method of manufacturing the same. In addition, the present invention provides a ceramic heater in which an electrode rod connecting member is in area contact with one surface of a high-frequency electrode. The present invention also provides a method of manufacturing the ceramic heater. Hereinafter, the term 'contact', as described in the present specification, means that at least two or more constituent elements are into contact with one another, and the term 'grounded' means that a certain constituent element is electrically connected to the ground. In addition, the term 'attached', as described in the present specification, means that at least two or more constituent elements are attached to one another, and the term 'coupled' means that two or more constituent elements are incorporated into a single constituent element. Therefore, the term 'attached' as described in the present specification may be a sub-concept of the term 'coupled'.

Various exemplary embodiments of the present invention will be described in detail below with reference to the drawings.

Figure 2:
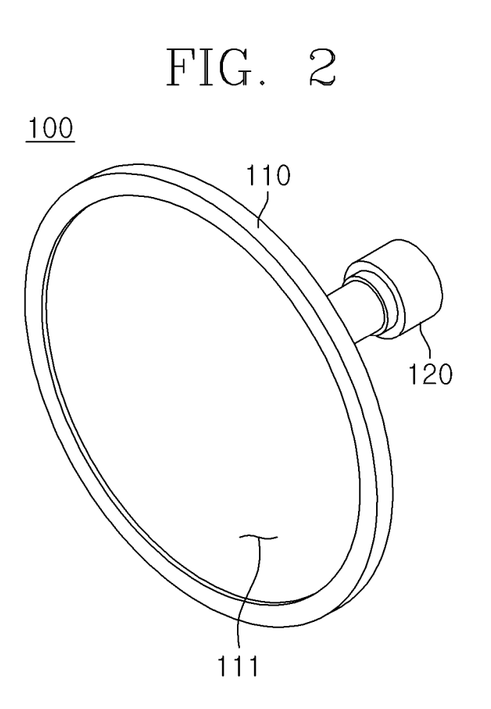
FIG. 2 is a perspective view illustrating an external shape of a ceramic heater according to an exemplary embodiment of the present invention.
Figure 3:
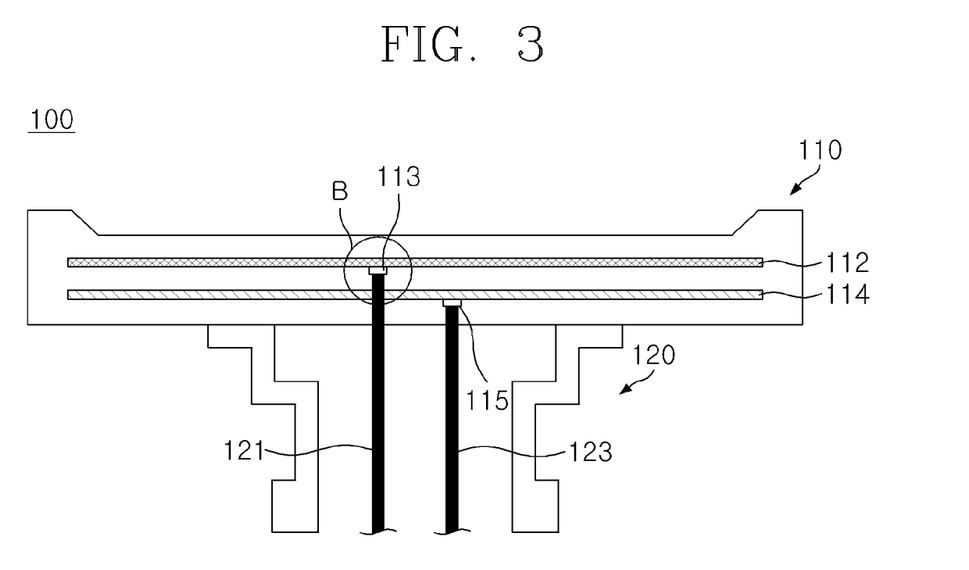
FIG. 3 is a cross-sectional view illustrating a configuration of the ceramic heater according to the exemplary embodiment of the present invention.
Figure 4:
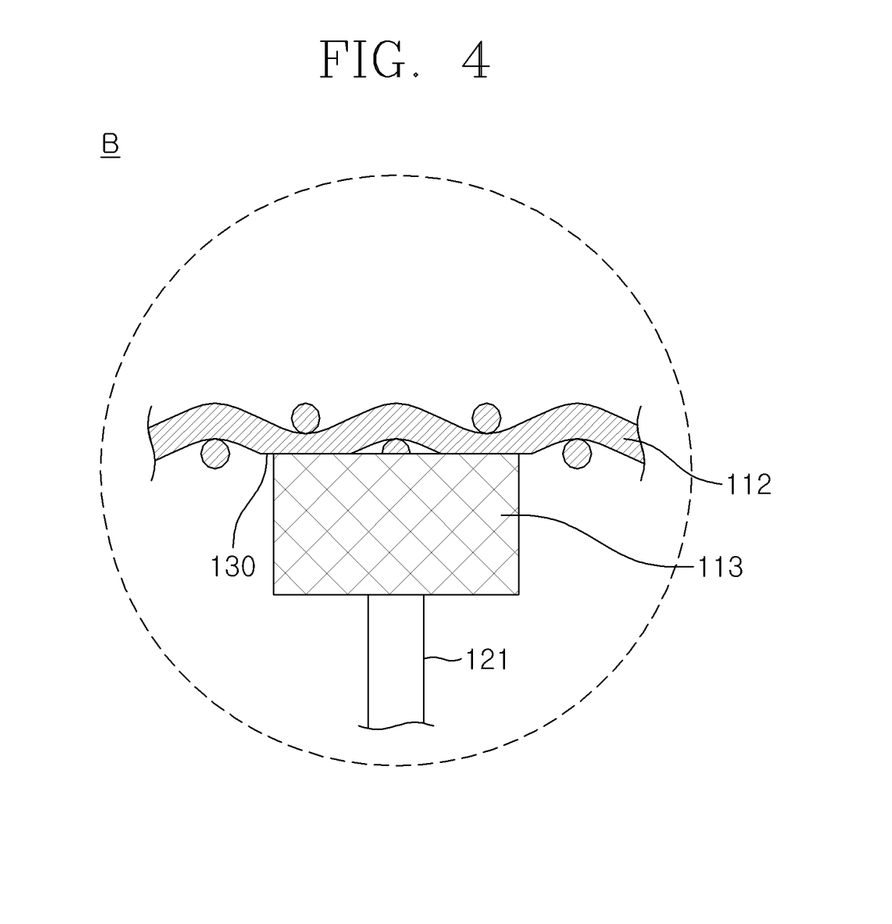
FIG. 4 is an enlarged view of part B illustrated in FIG. 3.

FIG. 2 is a perspective view illustrating an external shape of a ceramic heater according to an exemplary embodiment of the present invention, FIG. 3 is a cross-sectional view illustrating a configuration of the ceramic heater according to the exemplary embodiment of the present invention, and FIG. 4 is an enlarged view of part B illustrated in FIG. 3.

Referring to FIGS. 2 to 4, a ceramic heater 100 according to an exemplary embodiment of the present invention is a semiconductor device configured to support a heat treatment subject used for various purposes, such as a semiconductor wafer, a glass substrate, a flexible substrate, or the like, and to heat the heat treatment subject to a predetermined temperature.

The ceramic heater 100 includes a heater body 110 configured to transfer heat to the heat treatment subject (not illustrated) while stably supporting the heat treatment subject, and a heater support 120 mounted on a lower portion of the heater body 110. Meanwhile, although not illustrated in the drawings, a bonding layer (not illustrated) may be formed between the heater body 110 and the heater support 120.

The heater body 110 may be formed to have a plate-shaped structure having a predetermined shape. As an example, the heater body 110 may have, but not necessarily limited to, a circular plate-shaped structure.

A pocket region (or cavity region) 111 having a structure recessed to have a predetermined stepped portion may be formed in an upper portion of the heater body 110 so that the heat treatment subject such as a wafer may be stably mounted in the pocket region 111. An upper surface of the heater body 110, which corresponds to the pocket region, may be formed to have excellent flatness. The excellent flatness allows the heat treatment subject installed in a chamber to be disposed horizontally while preventing the heat treatment subject from being inclined in one direction.

The heater body 110 includes multiple ceramic plates (not illustrated) made of a ceramic material excellent in thermal conductivity. The heater body 110 may be formed by performing a process of compressing and sintering the multiple ceramic plates. Here, the ceramic material may be at least one of $Al_2O_3$, $Y_2O_3$, $Al_2O_3/Y_2O_3$, $ZrO_2$, AlC (autoclaved lightweight concrete), TiN, AlN, TiC, MgO, CaO, $CeO_2$, $TiO_2$, $B_xC_y$, BN, $SiO_2$, SiC, YAG, Mullite, and $AlF_3$, and more particularly, the ceramic material may be aluminum nitride (AlN).

The heater body 110 may include a high-frequency electrode 112, a first rod connecting member 113 being in contact with a lower surface of the high-frequency electrode 112, a heating element 114 disposed below the high-frequency electrode 112, and a second rod connecting member 115 being in contact with a lower surface of the heating element 114.

The high-frequency electrode (or ground electrode 112) is embedded in an upper portion of the heater body 110 and may be formed in a circular plate shape. The high-frequency electrode 112 is an electrode layer used for performing plasma enforced chemical vapor deposition and may be selectively grounded or connected to an RF power source.

The high-frequency electrode 112 may be any one of a mesh type, a sheet type, and a paste type, and more particularly, the high-frequency electrode 112 may be the mesh type. In the case in which the high-frequency electrode 112 is the mesh type, the high-frequency electrode 112 is manufactured in the form of a woven fabric in which multiple metal wires arranged in a vertical direction and multiple metal wires arranged in a horizontal direction intersect one another.

The high-frequency electrode 112 may be made of tungsten (W), molybdenum (Mo), silver (Ag), gold (Au), niobium (Nb), titanium (Ti), aluminum nitride (AlN) or an alloy thereof, and more particularly, the high-frequency electrode 112 may be made of molybdenum (Mo).

A thickness of the high-frequency electrode 112 may be 0.1 to 0.5 mm, more particularly, 0.2 mm. In addition, a diameter of the high-frequency electrode 112 may be 300 to 350 mm, more particularly, 320 mm.

The high-frequency electrode 112 may selectively perform any one of a radio frequency (RF) ground function and an electrostatic chuck function. Here, the 'RF ground function' means a function that discharges, to the external ground, electric currents with which the heater body 110 is charged by plasma in the chamber during a wafer deposition process. Further, the 'electrostatic chuck function' means a function of attaching the heat treatment subject such as a wafer to the upper surface of the heater body 110 by using an electric field.

A horizontal cross-sectional portion 130 to be in area contact with the electrode rod connecting member 113 may be formed on one region of the high-frequency electrode 112. A position (or location) of the horizontal cross-sectional portion 130 may be varied according to an embedded position of the electrode rod connecting member 113 in contact with the high-frequency electrode 112.

The heating element 114 is embedded in a lower portion of the heater body 110 and may have a shape corresponding to the shape of the heat treatment subject. The heating element 114 may be disposed below the high-frequency electrode 112 and spaced apart from the high-frequency electrode 112 at a predetermined distance.

The heating element 114 may be embedded in the heater body 110 and disposed at a position corresponding to the position of the heat treatment subject. In addition, the heating element 114 may be embedded in the heater body 110 so as to be in parallel with the heat treatment subject so that a heating temperature may be uniformly controlled in accordance with the positions and a distance from which the heat is transferred to the heat treatment subject is maintained to be constant at most of the positions in order to uniformly heat the entire heat treatment subject.

The heating element 114 may be formed in the form of a plate-shaped coil or a flat plate formed by heat generating wires or resistance wires. In addition, the heating element 114 may have a multilayer structure for precisely controlling the temperature.

The heating element 114 serves to heat, with a constant temperature, the heat treatment subject positioned on the upper surface of the heater body 110 in order to smoothly perform the deposition and etching processes during the semiconductor manufacturing process.

The first rod connecting member (or electrode rod connecting member 113) is in contact with the lower surface of the high-frequency electrode 112 and serves to electrically connect the high-frequency electrode 112 and a first rod 121.

The first rod connecting member 113 may be in area contact with one surface of the mesh type high-frequency electrode 112. To this end, as illustrated in FIG. 4, a horizontal cross-sectional portion 130 may be formed by processing one surface of the high-frequency electrode 112 with mechanical process equipment or chemical process equipment. In this case, a thickness of the processed one surface of the high-frequency electrode 112 may be ⅓ to ½ of an overall thickness of the high-frequency electrode 112. In addition, an area of the horizontal cross-sectional portion 130 formed on one surface of the high-frequency electrode 112 may be equal to or larger than an area of the contact surface of the first rod connecting member 113.

As a method of processing one surface of the high-frequency electrode 112 in order to form the horizontal cross-sectional portion 130, polishing, pressing, or rolling is used, but the present invention is not necessarily limited thereto.

The term 'point contact', as described in the present specification, means that multiple metal wires (i.e., circular wires), which constitute the high-frequency electrode, are in contact with one surface of the first rod connecting member. The term 'area contact' means that at least one part of each of the multiple metal wires, which constitute the high-frequency electrode, is processed to have the horizontal cross section, such that the horizontal cross sections of the metal wires are in contact with one surface of the first rod connecting member. However, during the ceramic heater manufacturing process, it is difficult to implement the ideal point contact between the high-frequency electrode and the first rod connecting member, as a result of which it is somewhat difficult to identify a boundary between the point contact and the area contact. Therefore, in the present exemplary embodiment, when the contact area between the high-frequency electrode and the first rod connecting member is equal to or smaller than a first critical value, the contact between the corresponding constituent elements is defined as the 'point contact'. In addition, when the contact area between the high-frequency electrode and the first rod connecting member is equal to or larger than a second critical value, the contact between the corresponding constituent elements is defined as the 'area contact'. Here, the first critical value and the second critical value may be set to be equal to or different from each other. As an example, a case in which the contact area between the high-frequency electrode and the first rod connecting member is 10% to 60% of the cross-sectional area of the first rod connecting member may be defined as the area contact. A case in which the contact area is smaller than 10% of the cross-sectional area of the first rod connecting member 113 may be defined as the point contact.

The first rod connecting member 113 may be attached to the horizontal cross-sectional portion 130 formed on one surface of the high-frequency electrode 112. In this case, the first rod connecting member 113 may be attached to the high-frequency electrode 112 by, but not necessarily limited to, a brazing process.

With the area contact between the first rod connecting member 113 and the high-frequency electrode 112, the contact resistance between the first rod connecting member 113 and the high-frequency electrode 112 is greatly reduced.

The second rod connecting member (or heating element rod connecting member) 115 is in contact with the lower surface of the heating element 114 and serves to electrically connect the heating element 114 and a second rod 123.

The first and second rod connecting members 113 and 115 may be made of metal excellent in electrical conductivity. As an example, the first and second rod connecting members 113 and 115 may be made of tungsten (W), molybdenum (Mo), silver (Ag), gold (Au), niobium (Nb), titanium (Ti), aluminum nitride (AlN), or an alloy thereof, and more particularly, the first and second rod connecting members 113 and 115 may be made of molybdenum (Mo).

The heater support 120 is mounted on the lower portion of the heater body 110 and serves to support the heater body 110. Therefore, the heater support 120 is coupled to the heater body 110, thereby implementing the ceramic heater 100 having a T shape as a whole.

The heater support 120 may have a cylindrical tube shape having therein a vacant space. Therefore, the multiple rods 121 and 123, which are connected to the high-frequency electrode 112 and the heating element 114 of the heater body 110, respectively, may be installed through the heater support 120.

Main materials of the heater support 120 may be identical to the ceramic materials of the heater body 110. For example, the heater support 120 may be made of at least one of $Al_2O_3$, $Y_2O_3$, $Al_2O_3/Y_2O_3$, $ZrO_2$, AlC (autoclaved lightweight concrete), TiN, AlN, TiC, MgO, CaO, $CeO_2$, $TiO_2$, $B_xC_y$, BN, $SiO_2$, SiC, YAG, Mullite, and $AlF_3$, and more particularly, the heater support 120 may be made of aluminum nitride (AlN).

The first rod (or electrode rod) 121 is installed in the heater support 120 and may serve to electrically connect the first rod connecting member 113 and the external ground (not illustrated). Therefore, the high-frequency electrode 112 embedded in the heater body 110 may be electrically connected to an RF power source or the external ground through the first rod 121.

The second rod (or heating element rod) 123 is installed in the heater support 120 and may serve to electrically connect the second rod connecting member 115 and an external power source (not illustrated). Therefore, the heating element 114 embedded in the heater body 110 may be electrically connected to the external power source through the second rod 123.

The first and second rods 121 and 123 may be made of metal excellent in electrical conductivity. As an example, the first and second rods 121 and 123 may be made of copper (Cu), aluminum (Al), iron (Fe), tungsten (W), nickel (Ni), silver (Ag), gold (Au), niobium (Nb), titanium (Ti), or an alloy thereof, and more particularly, the first and second rods 121 and 123 may be made of nickel (Ni).

As described above, in the case of the ceramic heater according to the exemplary embodiment of the present invention, one surface of the high-frequency electrode is processed, and thus the high-frequency electrode and the electrode rod connecting member are coupled to be in area contact with each other, such that the contact resistance between the high-frequency electrode and the electrode rod connecting member may be effectively reduced.

Figure 5:
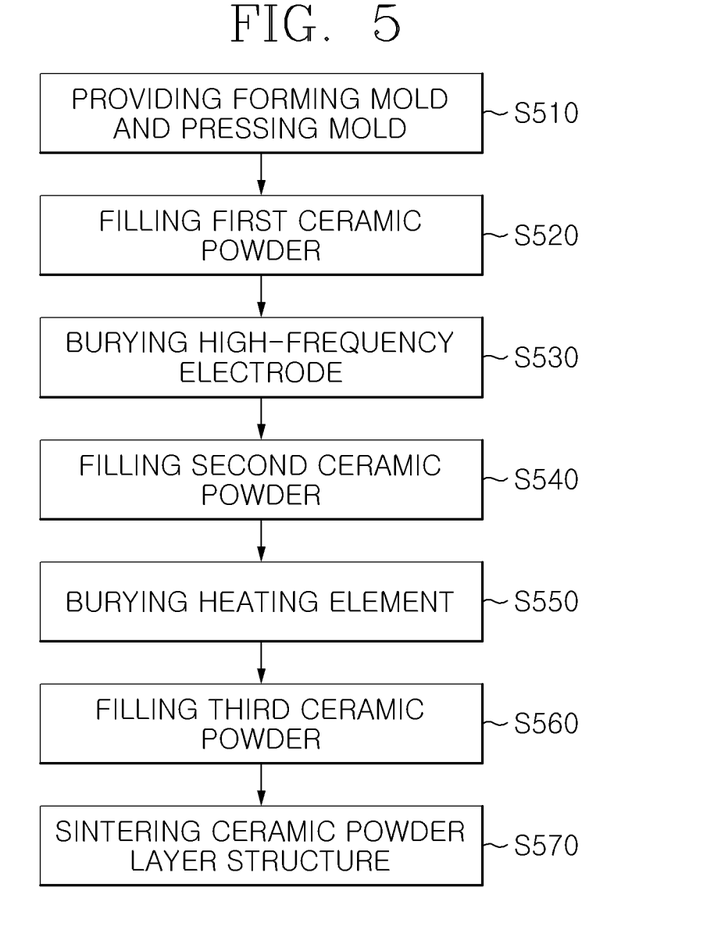
FIG. 5 is a flowchart for explaining a method of manufacturing a heater body that constitutes the ceramic heater illustrated in FIG. 3.
Figure 6:
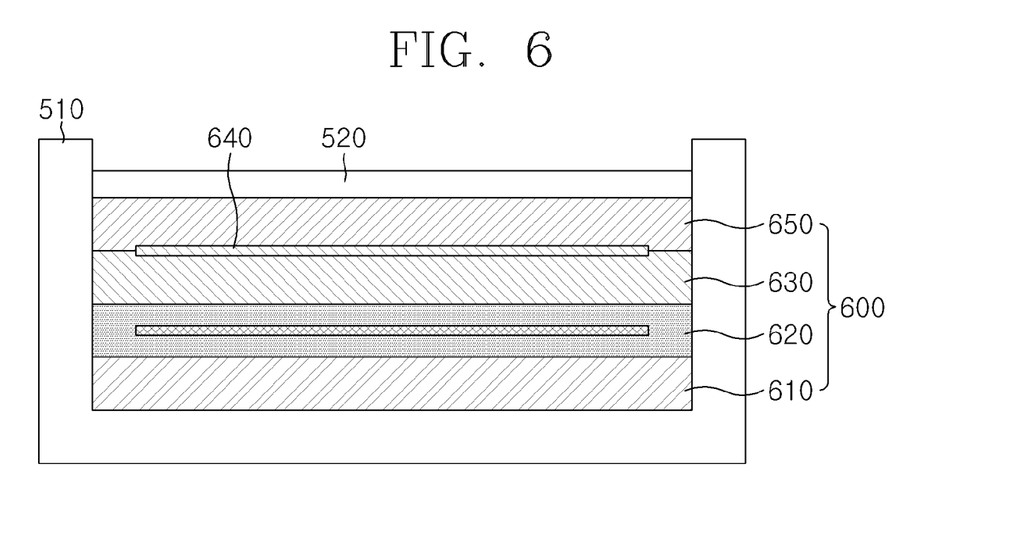
FIG. 6 is a view for explaining the method of manufacturing the heater body that constitutes the ceramic heater illustrated in FIG. 3.

FIG. 5 is a flowchart for explaining a method of manufacturing the heater body that constitutes the ceramic heater illustrated in FIG. 3, and FIG. 6 is a view for explaining the method of manufacturing the heater body that constitutes the ceramic heater illustrated in FIG. 3.

Referring to FIGS. 5 and 6, a forming mold (or an accommodation mold) 510, which corresponds to the overall shape of the heater body that constitutes the ceramic heater 100 according to the exemplary embodiment of the present invention, may be provided, and a pressing mold 520 configured to apply pressure to ceramic powder contained in the forming mold 510 may be provided (S510).

A first ceramic powder layer 610 may be formed by filling the forming mold 510 with first ceramic powder (S520). A ceramic molded body 620 in which the high-frequency electrode (not illustrated) is buried (i.e. embedded) may be processed in advance and then stacked on an upper portion of the first ceramic powder layer 610 in the forming mold 510 (S530). In this case, the ceramic molded body 620 may be provided in the form of a molded body pressed with a predetermined pressure in order to maintain its shape.

Thereafter, a second ceramic powder layer 630 may be formed by filling an upper portion of the ceramic molded body 620 within the forming mold 510 with second ceramic powder (S540). Further, a heating element 640 having a plate-shaped structure having a spiral or mesh shape may be processed in advance and then buried in an upper portion of the second ceramic powder layer 630 (S550).

Next, a third ceramic powder layer 650 may be formed by filling an upper portion of the heating element 640 within the forming mold 510 with third ceramic powder (S560). The first to third ceramic powder may include aluminum nitride (AlN) powder and may selectively include yttrium oxide $Y_2O_3$ of about 0.1 to 10%, particularly, about 1 to 5%.

A heater body 600 may be formed by sequentially stacking the first ceramic powder layer 610, the ceramic molded body 620, the second ceramic powder layer 630, the heating element 640, and the third ceramic powder layer 650, pressing the stack with a predetermined pressure by using the pressing mold 520, applying high-temperature heat to the stack, and thus sintering the ceramic powder layers (S570). As an example, the heater body 600 may be compressed and sintered with a pressure of about 0.01 to 0.3 ton/cm$^2$ and at a temperature of about 1,600 to 1,950° C.

Hereinafter, a method of manufacturing the ceramic molded body 620 capable of performing the RF ground function and included in the elements that constitute the heater body 600 will be described in detail.

FIGS. 7A to 7D are views for explaining the method of manufacturing the ceramic molded body according to the exemplary embodiment of the present invention.

Figure 7A:
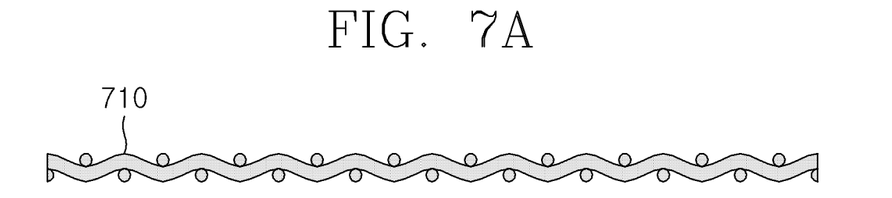
FIGS. 7A to 7D are views for explaining a method of manufacturing a ceramic molded body according to the exemplary embodiment of the present invention.

Referring to FIG. 7A, a mesh type high-frequency electrode 710 may be formed in the form of a woven fabric in which multiple metal wires arranged in a first direction and multiple metal wires arranged in a second direction perpendicularly intersect one another. In this case, the multiple metal wires may be made of molybdenum (Mo) excellent in electrical conductivity.

Figure 7B:
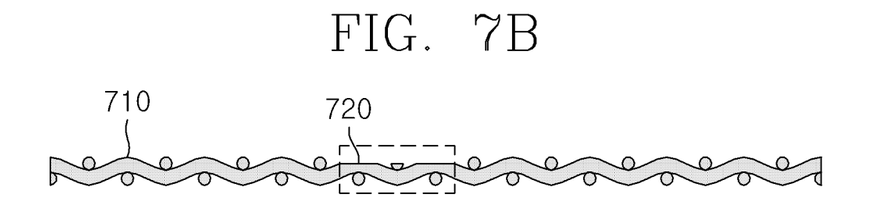

Referring to FIG. 7B, a horizontal cross-sectional portion 720 may be formed by processing, for example, polishing, pressing, or rolling an upper surface of the high-frequency electrode 710, which is to be in contact with a first rod connecting member 730, by using mechanical process equipment or chemical process equipment. In this case, an area of the horizontal cross-sectional portion 720 formed on the upper surface of the high-frequency electrode 710 may be equal to or larger than an area of the contact surface of the first rod connecting member 730.

Figure 7C:
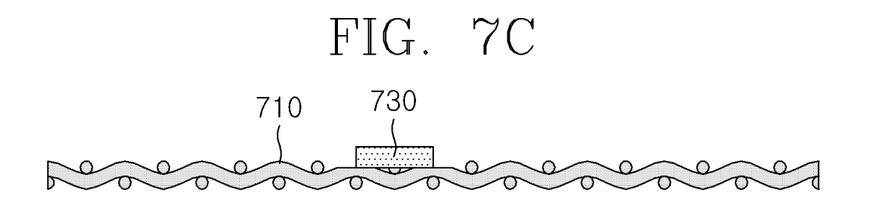

Referring to FIG. 7C, the first rod connecting member 730 may be attached to the horizontal cross-sectional portion 720 formed on the upper surface of the high-frequency electrode 710. Therefore, the horizontal cross-sectional portion 720 formed on the high-frequency electrode 710 and the first rod connecting member 730 are in area contact with each other.

Figure 7D:
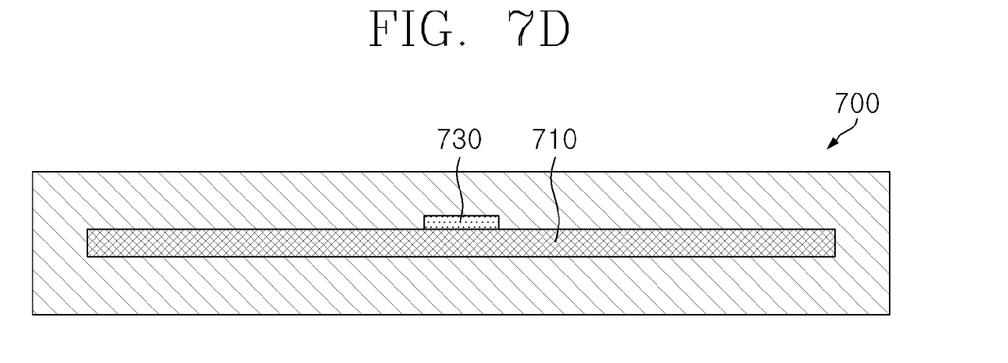

Referring to FIG. 7D, ceramic powder is provided around the high-frequency electrode 710 and the first rod connecting member 730 disposed in a forming mold (not illustrated), and the structure stacked in the forming mold is sintered through a hot press process, such that a ceramic molded body 700 is manufactured.

As described above, according to the method of manufacturing the ceramic molded body according to the exemplary embodiment of the present invention, no vacuum binder is required to be used to couple the high-frequency electrode and the first rod connecting member, as a result of which it is possible to effectively prevent a local increase in resistance caused by the use of the vacuum binder.

According to at least one of the exemplary embodiments of the present invention, one surface of the high-frequency electrode is processed, and thus the high-frequency electrode and the electrode rod connecting member are coupled to be in area contact with each other, such that the contact resistance between the high-frequency electrode and the electrode rod connecting member may be reduced, as a result of which reliability of the ceramic heater may be improved.

According to at least one of the exemplary embodiments of the present invention, no vacuum binder is required to be used to couple the high-frequency electrode and the electrode rod connecting member to prevent the electrode rod from moving during a sintering process in the ceramic heater manufacturing process. As a result, it is possible to effectively prevent a local increase in resistance caused by the use of the vacuum binder.

However, the effects obtained by the ceramic heater and the method of manufacturing the ceramic heater according to the exemplary embodiments of the present invention are not limited to the aforementioned effects, and other effects, which are not mentioned above, will be clearly understood by those skilled in the art from the following description.

While the specific exemplary embodiments of the present invention have been described above, various modifications may of course be made without departing from the scope of the present invention. Accordingly, the scope of the present invention should not be limited to the described exemplary embodiments and should be defined by not only the claims to be described below, but also those equivalent to the claims.

What is claimed is:

1. A ceramic heater comprising:
    a heater body having a mesh type high-frequency electrode comprising multiple wires and an electrode rod connecting member being in contact with a lower surface of the high-frequency electrode; and
    a heater support mounted on a lower portion of the heater body and configured to support the heater body,
    wherein the high frequency electrode has a horizontal cross-sectional portion to be in area contact with the electrode rod connecting member and formed on at least one portion of the high-frequency electrode, and
    wherein, in the high-frequency electrode, a wire thickness of at least a first portion of the high-frequency electrode where the horizontal cross-sectional portion is formed is smaller than a wire thickness of a second portion of the high-frequency electrode where the horizontal cross-sectional portion is not formed.

2. The ceramic heater of claim 1, wherein the high frequency electrode includes a plurality of wire type metals arranged in a first direction and a plurality of wire type metals arranged in a second direction perpendicular to the first direction.

3. The ceramic heater of claim 1, wherein the horizontal cross-sectional portion is formed by processing one surface of the high-frequency electrode.

4. The ceramic heater of claim 3, wherein a thickness of a portion removed by processing one surface of the high-frequency electrode is ⅕ to ½ of an overall thickness of the high-frequency electrode.

5. The ceramic heater of claim 3, wherein a method of processing one surface of the high-frequency electrode includes a polishing method and a rolling method.

6. The ceramic heater of claim 1, wherein the horizontal cross-sectional portion is equal to or larger than an area of a contact surface of the electrode rod connecting member.

7. The ceramic heater of claim 1, wherein the horizontal cross-sectional portion is formed at a position of the high-frequency electrode corresponding to a position of the electrode rod connecting member.

8. The ceramic heater of claim 1, wherein the electrode rod connecting member is attached to the horizontal cross-sectional portion of the high-frequency electrode through a brazing process.

9. The ceramic heater of claim 1, wherein a contact area between the high-frequency electrode and the electrode rod connecting member is equal to or larger than a predetermined critical value.

* * * * *